(12) United States Patent
Wu et al.

(10) Patent No.: US 8,804,746 B2
(45) Date of Patent: Aug. 12, 2014

(54) NETWORK BASED ON IDENTITY IDENTIFIER AND LOCATION SEPARATION ARCHITECTURE BACKBONE NETWORK, AND NETWORK ELEMENT THEREOF

(75) Inventors: Qiang Wu, Shenzhen (CN); Bing Huang, Shenzhen (CN); Tao Fu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 116 days.

(21) Appl. No.: 13/496,727

(22) PCT Filed: Sep. 13, 2010

(86) PCT No.: PCT/CN2010/076848
§ 371 (c)(1),
(2), (4) Date: Mar. 16, 2012

(87) PCT Pub. No.: WO2011/032479
PCT Pub. Date: Mar. 24, 2011

(65) Prior Publication Data
US 2012/0176936 A1 Jul. 12, 2012

(30) Foreign Application Priority Data
Sep. 17, 2009 (CN) .......................... 2009 1 0171975

(51) Int. Cl.
*H04L 12/28* (2006.01)
(52) U.S. Cl.
USPC ....................................... 370/396
(58) Field of Classification Search
None
See application file for complete search history.

(56) References Cited

U.S. PATENT DOCUMENTS 7,130,629 B1 * 10/2006 Leung et al. ............... 455/435.1
(Continued)

FOREIGN PATENT DOCUMENTS

| CN | 1401173 A | 3/2003 |
|---|---|---|
| CN | 1801764 A | 7/2006 |

OTHER PUBLICATIONS

Kye-Hwan Lee Hierarchical Mapping Information Distribution System for ID/Loc Separation for Scalable Addressing and Routing, Jun. 2009, http://ieeexplore.ieee.org/stamp/stamp.jsp?tp=&arnumber=5195969, pp. 249-252.*
International Search Report for PCT/CN2010/076848 dated Nov. 25, 2010.
Tin, Jin et al, Cache Consistency Strategy based on GPRS networks, Journal of China Institute of Communications, vol. 26, No. 4, Apr. 30, 2005, sections 2.

(Continued)

*Primary Examiner* — Anh-Vu Ly
*Assistant Examiner* — Gustavo Lopez-Vargas
(74) *Attorney, Agent, or Firm* — Banner & Witcoff, Ltd.

(57) ABSTRACT

The present invention provides a network based on identity identifier and location separation architecture and each component in the network. The network based on identity identifier and location identifier separation architecture includes access networks and a backbone network, and the access networks and the backbone network have no overlap in topology relation, wherein, the access network is located at an edge of the backbone network, and is set to achieve endpoint access in the access network; the backbone network is set to achieve routing and forwarding of data messages between the endpoints which access via the access networks; in the network, an access identifier (AID) is taken as an identity identifier of an endpoint user, and a routing identifier (RID) is used as a location identifier of the endpoint. The present invention achieves the identity identifier and location separation based on the network.

20 Claims, 3 Drawing Sheets

(56) References Cited

U.S. PATENT DOCUMENTS

| | | | |
|---|---|---|---|
| 2007/0237108 A1* | 10/2007 | Baard | 370/328 |
| 2008/0089335 A1* | 4/2008 | Li et al. | 370/392 |
| 2008/0182580 A1* | 7/2008 | Laroia et al. | 455/440 |
| 2008/0281973 A1* | 11/2008 | Yang | 709/228 |
| 2009/0228575 A1* | 9/2009 | Thubert et al. | 709/220 |
| 2009/0238164 A1* | 9/2009 | Yao et al. | 370/338 |
| 2010/0009678 A1* | 1/2010 | Munoz Munoz et al. | 455/433 |
| 2010/0014440 A1* | 1/2010 | Yazaki et al. | 370/252 |
| 2010/0056215 A1* | 3/2010 | Gorokhov et al. | 455/561 |

OTHER PUBLICATIONS

An ID/Locator Split Architecture of Future Networks, Ved P. Kafle, Hideki Otsuki and Masugi Inoue, ITU-T Kaleidoscope Academic Conference, 2009, 10 pages Hierarchical Mapping Information Distribution System for ID/Loc Separation for Scalable Addressing and Routing, Kye-Hwan Lee and Young-Tak Kim, IEEE, 2009, 4 pages.

* cited by examiner

NETWORK BASED ON IDENTITY IDENTIFIER AND LOCATION SEPARATION ARCHITECTURE BACKBONE NETWORK, AND NETWORK ELEMENT THEREOF

TECHNICAL FIELD

The present invention relates to the network architecture in the field of communications technology, and more particularly, to an identity identifier and location separation architecture based network and its components.

BACKGROUND OF THE RELATED ART

In the Legacy Transmission Control Protocol (TCP)/Internet Protocol (IP) network environment, the IP provides routing functionality to the Internet. The IP allocates logical addresses, that is, the IP addresses, to all the nodes (including hosts and routers), and each port of every host is allocated an IP address. The IP address comprises a network prefix and a host part, and the IP addresses of all the hosts in the same one link usually have the same network prefix and different host parts, which makes the IP able to select the routing based on the network prefix part of the destination node's IP address, so that the router only keep a simple network prefix routing and does not need to save a separate routing for each host. In this case, since the network prefix routing is used, when the node switches from one link to another without changing its IP address, the node cannot receive data messages in the new link, thus can not communicate with other nodes.

Legacy IP networks do not support endpoint mobility, and the existing technology proposes various solutions, mainly comprising the Mobile IPv4, the Mobile IPV6, and the proxy mobile IPV6 (also abbreviated as PMIPv6) of the Internet Engineering Task Force (IETF), and the way of General Packet Radio Service technology (GPRS) Tunneling Protocol (GTP) of the Third Generation Partnership Project (3GPP) and so on. The existing technology uses the way of fixed anchor points to support the endpoint mobility, for example, the wideband code division multiple access (WCDMA) specifies the Gateway GPRS Support Node (GGSN) as the mobile anchor point of the endpoint; the code division multiple Address (CDMA) network uses the Mobile IP protocol to take the home agent (HA) as the anchor point. However, the fixed anchor point brings the issue of circuitous path of data packets, increases the transmission delay and bandwidth waste. With the development of the 2G/3G/4G wireless packet technologies, the number of mobile Internet users and traffic gradually increase, and gateway devices such as GGSN gradually switch downwards, which makes the problem of circuitous path even worse.

Both the Mobile IPV4 and the Mobile IPV6 are endpoints based mobility solutions that are characterized by that the endpoints need to deal with mobility-related processes.

The main problem of the Mobile MIPv4 is circuitous routing, for example, the endpoint A opens an account in the X area, and the corresponding HA is in the X area. The communication peer endpoint B is in the Y area. Even if the A roams to the Y area, its data flow still needs to be sent from the Y area back to the X area, and then sent to the peer endpoint B.

Relative to the MIPV4, the major improvement of the Mobile MIPV6 is that a path optimization process is defined to avoid the circuitous path, but it has the following problems:

1) first, the MIPV6 path optimization process is an end-to-end process, the endpoints should support the Mobile IPV6, but in fact, there are relatively few endpoints supporting the MIPV6, and the fixedly accessed endpoints generally do not support, which makes the MIPV6 path optimization process difficult to implement;

2) a new address should be allocated at each time that a user switches, the address allocation takes a long time, which leads to a large switching delay.

Another type of technology is network-based mobility solutions, including Proxy Mobile IP, 3GPP GPRS Tunneling Protocol (GTP) tunnel, and so on.

The ways of PMIPv6 and the GTP are relatively similar from the routing point of view. The main problem is:

1) there are Local Mobility Anchors (LMA), Packet Data Network Gateway (PGW), or the GGSN, and circuitous routing will be introduced here, and the circuitous routing problem is similar to the MIPV4 in the static IP address allocation method;

2) once the endpoint powers up and is online, it must be anchored to a LMA, PGW, or GGSN, no matter whether it is Local Breakout, dynamically specified LMA or another existing method, and when the endpoint location changes subsequently, the anchor location will not change unless the endpoint is allocated a new address after dropping off and then being online again.

The IP address in the TCP/IP protocol extensively used by the existing Internet has dual function, both as the location identifier of the communication endpoint host network interface in the network layer in the network topology, and as the identity identifier of the host network interface in the transport layer. The TCP/IP protocol design did not consider the host mobility at the very beginning. However, when the host mobility is more and more common, the shortcoming of semantic overload of the IP address is increasingly evident. When the IP address of the host changes, not only the routing but also the identity identifier of the communication endpoint host will change, which leads to increasingly heavy routing load, and the change of the host identifier will lead to the disruption in the applications and the connections.

The purpose of proposing the identity identifier and location separation problem is intended to resolve problems comprising the semantic overload of the IP address and the heavy routing overload and so on, separate the dual function of the IP address and achieve the support of mobility, multiple hosts, IP address dynamic reallocation, routing load reduction and visits among different network areas in the next-generation Internet.

The IP does not support mobility, whose essential reason is that the IP address contains the dual properties of identity and location.

The identity attribute of the IP address is: in the TCP/IP protocol stack, the IP address is used to identify the communication peer endpoint.

The location attribute of the IP address is: the IP address represents which network segment where the user is located, which is the basis for routing.

In the fixed network, there is no problem that the location and the identity attributes of the IP address are combined as one, which is because the endpoint location keeps unchanged, when the IP address will not change, so as the identity attribute.

But to the mobile Internet, the movement of the endpoint location results in that the IP address must be changed, otherwise, the routing can not be implemented; but the change of the IP address leads to the change of the endpoint identity, and the TCP/User Datagram Protocol (UDP) connection must be broken and reconnected, which is unacceptable for most applications. Therefore, the support of the Legacy IP protocol on mobility has fundamental problems.

In the existing technology, there are two main solutions for the identity identifier and location separation, one solution is host-based implementation, and the other is router-based implementation, and each implementation has multiple related technologies to support. The main existing host-based protocol is the host identity protocol (HIP), and the main existing routing-based protocol the location and identity separation protocol (LISP), and so on.

The HIP is a host mobility associated protocol, and the HIP separates the IP address into the endpoint identifier and the location identifier. The basic idea of the HIP is to introduce the $3.5^{th}$ layer: the Host Identity Layer (HIL) between the network layer (the third layer) and the transport layer (the fourth layer), that is, introducing the Host Identity (HI) space between the domain name space and the IP address space. The Host identifier layer separates the originally tightly coupled transport layer and network layer, and the IP address does not play the role of identifying the host any more, it is only responsible for routing forwarding of the packets, that is, it only works as a locator, the host name is expressed by the host identifier. The host identifier layer is logically located between the network layer and the transport layer, the transport layer uses the transport layer identifier, and the host identifier layer completes the conversion between the host identifier in the data packet and the IP address. The network layer is shielded from the transport layer, and any change of the network layer (for example, the change of the host IP address in the communication process) will not affect the transport layer link, unless the quality of service changes.

Thus, the transport layer connection is established on the host identifier, and the IP address can only be used for the network layer routing but not used to identify the host identity. The key idea of the HIP is to disconnect the tightly coupling between the network layer and the transport layer, so that the connection between the application layer and the transport layer is not affected by the change of the IP address. When the IP address changes in a connection, the HI remains unchanged, thus ensuring that the connection is not interrupted. In hosts supporting the HIP, the IP addresses can only be used for routing and addressing, while the HI is used to identify the endpoint host corresponding to a connection, and replaces the IP address used in the connection socket.

The HIP is a host protocol, whose main problem is: the premise of deployment is that all the endpoints participating in the communication need to synchronously support the HIP, and the endpoints even the upper-layer applications need to be changed substantially. The network does not participate in the management of the user access, and needs to participate in maintaining the communication links in the location update stage when both of the communication endpoints move synchronously, or else, the problem of packet loss will occur. In addition, the HIP cannot implement anonymous communication.

The LISP reuses the routing technology, makes a certain change to the existing routing topology, and optimizes the existing transport technology with the minimal modification when combined with the existing transport network.

The host uses the IP address (called as endpoint identifier (EID) in the LISP system) to track the socket, establish connection, send and receive data packets.

The router transmits data packets based on the IP destination address (called as the routing location (RLOCs) in the LISP system).

The tunneling routing is introduced in the LISP system, and the LISP data packets are encapsulated when initiating the host packets and de-encapsulated before the packets are finally sent to the destination. The IP address of the "outer header" in the LISP packets is the RLOCs. In the end-to-end packet exchange process between hosts in two networks, the ITR (ingress tunneling router) encapsulates each packet with a new LISP header, and the egress tunneling router moves the new header. The ITR implements the EID-to-RLOC inquiry to determine the routing path to ETR (egress tunneling router), and the ETR takes the RLOC as one of its own addresses.

The proposal of the LISP is not for solving the problem of mobility but mainly for solving the problem of network size that is targeted at the problem of the too large routing table, the mobility and multi-host attributes are side problems to be solved after the identifier and location are separated, and there are no specific solutions and implementation methods so far.

In addition, the LISP is a network-based protocol, and only affects the network part, which is more precisely only affecting the existing Internet backbone rather than the access layer and the user hosts in the existing network, and completely transparent to the hosts.

In summary, the existing network technologies have the following shortcomings:

the TCP/IP uses the way of fixed anchors to support the mobility of the endpoint in the prior art, but the fixed anchors bring the issue of circuitous path of the data packets, increase the transmission time-delay and the bandwidth waste. The MIPV6 routing optimization process needs that the hosts participating in communication support the MIPV6 protocol, and the deployment is difficult;

the IP address in the TCP/IP has a dual function: both as the location identifier of the communication endpoint host network interface in the network layer in the network topology, and as the host network interface identity identifier in the transport layer. The identity identifier and location separation frameworks: HIP, LISP, and so on in the prior art are a new network framework constructed to overcome the shortcomings of the existing network technology. The host-based HIP needs to do relatively large modification on endpoints and upper-layer services, and its deployment is difficult; the network is needed to participate in maintain the communication links at the stage when both communication endpoints move simultaneously and the location updates, otherwise, the problem of packet loss will occur. For the network-based LISP, the mobility and multi-host attributes are side problems to be solved after the identifier and location are separated, and there are no specific solutions and implementation methods so far.

The scalability of the routing system is poor, and an important reason causing the routing system scalability in the legacy IP network is the change of the routing table size and the network topology. The main application scenery considered when the Legacy IP network is initially designed is the fixed access mode, and the IP address comprises the network prefix and the host part, and all the hosts in the same link usually have the same network prefix and different host parts. The Legacy IP network uses the network prefix routing, and the change of the network topology will affect the IP address allocation of the endpoint hosts. Under this mechanism, continuously increasing host mobility demand will increase the network topology complexity, leading to the increasing number of routing table entries and the increasing probability of the change of the routing table.

SUMMARY OF THE INVENTION

According to the above shortcomings in the related art, the technical problem to be solved in the invention is to provide a network based on identity identifier and location separation architecture and each component in the network to achieve the network-based identity identifier and location identifier separation.

Another technical problem to be solved in the invention is to support the application scenes of the mobile endpoints in the network with the architecture to effectively solve the problem of circuitous routing in this scene.

Another technical problem to be solved in the invention is to provide a network based on identity identifier and location separation architecture and the components thereof, wherein, it is considered in the deployment of the network with the architecture the demand of compatible with endpoints, compatible with the upper-layer services, and it only needs to upgrade the network side devices and the compatibility does not change application scenes of the endpoints.

To solve the aforementioned problem, the present invention provides a network based on identity identifier and location identifier separation architecture, the network comprising access networks and a backbone network, and the access networks and the backbone network having no overlap in topology relationship, wherein:

the access network is located at an edge of the backbone network, and is set to achieve endpoint access in the access network;

the backbone network is set to achieve routing and forwarding of data messages between the endpoints which access via the access networks;

in the network, an access identifier (AID) is taken as an identity identifier of an endpoint user, and a routing identifier (RID) is used as a location identifier of the endpoint.

The aforementioned network may also have the following feature:

the backbone network comprises access service nodes (ASNs) which work as boundary nodes between the access networks and other part in the backbone network.

The aforementioned network may also have the following feature:

the network further comprises access service nodes (ASNs) which are located in the boundary nodes between the backbone network and the access networks, and with interfaces to the backbone network and the access networks.

The aforementioned network may also have the following feature:

a unique AID is allocated to each endpoint user in the network, wherein, the AID is used in the access network and always remains the same during moving of the endpoint; the RID is the location identifier allocated to each endpoint in the network and is used in the backbone network.

The aforementioned network may also have the following feature:

the access network is set to provide the endpoints with methods for accessing to a physical layer and a link layer, and to maintain physical access links between the endpoints and the ASN.

The aforementioned network may also have the following feature:

the backbone network is divided into two planes during networking: a generalized forwarding plane and a mapping forwarding plane, and the generalized forwarding plane and the mapping forwarding plane are respectively connected with the ASN, wherein:

the generalized forwarding plane is set to route and forward data messages which take the RIDs as destination addresses according to the RIDs in the data messages;

the mapping forwarding plane is set to store AID-RID mapping information of the endpoints, and to process registration and inquiry of the endpoint locations.

The aforementioned network may also have the following feature:

the mapping forwarding plane is further set to route and forward data packets which take the AID as the destination address.

The network may also have the following feature:

the ASN is set to provide access services for the endpoints, maintain connections between the endpoints and the network, allocate RIDs to the endpoints, register the RIDs of the endpoint to and inquire the RIDs of the endpoint in the mapping forwarding plane, maintain the AID-RID mapping information, and achieve the routing and forwarding of the data messages between the endpoints.

The aforementioned network may also have the following feature:

network elements in the generalized forwarding plane comprise a common router, which is set to route and forward the data messages whose source and destination addresses are in format of RID.

The aforementioned network may also have the following feature:

the network elements in the generalized forwarding plane further comprise an Interconnect Service Node (ISN) which has interfaces to the common router, the ASN and the mapping forwarding plane and is set to inquire and maintain the AID-RID mapping information of the endpoints in the network, encapsulate, route and forward the data packets between this network and the Legacy IP network, to achieve the interconnection between this network and the Legacy IP network.

The aforementioned network may also have the following feature:

the backbone network further comprises a authentication center, and the authentication center has signaling interfaces to the ASNs and is set to record attribute information of the users in the network, complete authentication and authorization of the endpoint access, or complete the authentication, authorization and accounting of the endpoint access.

The aforementioned network may also have the following feature:

the mapping forwarding plane comprises an Identity Location Register (ILR), and the ILR has signaling interface to the ASN and is set to accept a registration request and a registration cancel request, store, update, or delete the AID-RID mapping information of the home users in the network, as well as receive the request for inquiring the location of the endpoint, and return the RID corresponding to the endpoint AID in the request to an inquiry side.

The aforementioned network may also have the following feature:

the mapping forwarding plane further comprises a packet transfer function (PTF), and the PTF has a data forwarding interface to the ASN and is set to, after receiving the data message sent by the ASN, search out the RID corresponding to the AID according to the AID of the communication peer endpoint to which the data message is sent, and use the RID as the destination address of the data message, and send the data message to the ASN to which the communication peer endpoint accesses via the generalized forwarding plane.

The aforementioned network may also have the following feature:

the ILR and the PTF are located in the same network element which is denoted as ILR/PTF.

The aforementioned network may also have the following feature:

there are a signaling interface and a first data transmit-receive interface between the ASN and the endpoints, and the signaling interface between the ASN and the endpoints is set to process information flow of access management, switching, authentication, accounting and registration; in the data message at the first data transmit-receive interface, the source address is the AID of the endpoint which sends a data packet, and the destination address is the AID of the communication peer endpoint to which the data packet is sent.

The aforementioned network may also have the following feature:

there are a signaling interface and a second data forwarding interface between the ASNs, and the signaling interface between the ASNs is set to switch transmission of the management signaling during the switching, and deliver a RID update message when the location between the communication peer endpoints changes; the second data forwarding interface is set to forward data between the ASNs during the switching, wherein, the data message at the second data forwarding interface adds the tunneling encapsulation on the data message at the first data transmit-receive interface.

The aforementioned network may also have the following feature:

the generalized forwarding plane has a common router, and the external interface of the common router is the third data forwarding interface, and the data message at the third data forwarding interface is newly encapsulated a third-layer header on the basis of the data message at the first data transmit-receive interface, the source address in the new third-layer header is the RID allocated to the endpoint which sends the data packet, and the destination address is the RID allocated to the communication peer endpoint to which the data packet is sent.

The aforementioned network may also have the following feature:

the signaling interface between the ASN and the ISN is set for the ASN to notifies the ISN of the new AID-RID mapping information of the network endpoints.

The aforementioned network may also have the following feature:

the interfaces between the ASN and the mapping forwarding plane comprise a signaling interface and a fourth data forwarding interface, the signaling interface between the ASN and the mapping forwarding plane is set to inquire and maintain the AID-RID mapping information; the data message at the fourth data forwarding interface is newly encapsulated a third-layer header on the basis of the data packet at the first data transmit-receive interface, the source address in the new third-layer header is the RID allocated to the endpoint which sends the data packet, and the destination address is the routing address of the network element which is responsible for forwarding data messages in the mapping forwarding plane that is connected to the ASN.

The aforementioned network may also have the following feature:

there is a signaling interface between the ILRs in the mapping forwarding plane, and the signaling interface is set to inquire and maintain the AID-RID mapping information and exchange routing information in the mapping forwarding plane.

The aforementioned network may also have the following feature:

there is a data forwarding interface between the ISN and the Legacy IP network, the data message at this data forwarding interface has the same format as the data message in the Legacy IP network.

In view of the above shortcomings of the existing technology, the present invention also provides a system comprising the above identity identifier and location separation architecture based network, besides of the network, the system also comprises endpoints, and the endpoints are one or more of fixed endpoints, mobile endpoints and nomadic endpoints. The endpoints are existing endpoints supporting the IPV4 or IPV6 protocol stack, or, the endpoints are endpoints whose protocol stack supports the AID coding requirement.

According to the above shortcomings of the existing technology, the present invention also provides an access service node (ASN) in the network based on identity identifier and location identifier separation architecture, wherein, the access service node is set to provide access services for the endpoints, maintain the connections between the endpoints and the network, allocate routing identities (RIDs) to the endpoints, register and inquire the RIDs of the endpoint in the mapping forwarding plane, maintain the access identifier to routing identifier (AID-RID) mapping information of the endpoints, and implement the routing and forwarding of the data message; the ASN is further set to cooperate with an authentication center to authenticate the endpoints and charge the services, as well as cooperate with other ASNs to implement the switching of the endpoints across the ASNs.

The access service node may also have the following feature: comprising an access processing module, a registration module and a mapping management module, wherein, the access processing module is set to, when an endpoint requests to access, cooperate with the endpoint and the authentication center to complete the authentication of the endpoint, establish a connection with the endpoint via the access network, allocate a RID to the endpoint, and notify the registration module to register the endpoint;

the registration module is set to, after receiving the notification for registering the endpoint, launch a registration carrying the current AID-RID mapping information of the endpoint to a home Identity Location Register (ILR) of the endpoint; and after receiving a notification of canceling the registration for the endpoint, notify the home ILR of the endpoint to remove the endpoint registration information, including the AID-RID mapping information of the endpoint;

the mapping management module is set to, cache and maintain the AID-RID mapping information of the endpoint after the endpoint accesses, after receiving the inquiry notification, inquire the ILR in the mapping forwarding plane about the corresponding RID based on the AID of the communication peer endpoint, and locally maintain the queried AID-RID mapping information.

The aforementioned access service node may also have the following feature: the ASN further comprises a connection maintenance module and a message forwarding module, wherein:

the connection maintenance module is set to, during an online period after the endpoint accesses, maintain the connection between the ASN and the endpoint; and during the communication of the endpoint, maintain the connection between the local ASN and the ASN to which the communication peer endpoint accesses;

the message forwarding module is set to, encapsulate the data message sent by the endpoint accessing to the local ASN with the RIDs of the endpoint and the communication peer endpoint, route and forward to the ASN to which the communication peer endpoint accesses, and decapsulate the data message which is to be sent to the endpoint accessing to the local ASN and then send the decapsulated data message to the endpoint.

The access service node may also have the following feature: the message forwarding module is further divided into a first forwarding unit and a second forwarding unit, wherein, the first forwarding unit is set to, after receiving the data message sent by the endpoint accessing to the local ASN, inquire the AID-RID mapping information in the local cache according to the AID, which works as the destination address in the data message, of the communication peer endpoint, if the RID of the communication peer endpoint is searched out, take the RID of the communication peer endpoint as the destination address, and take the RID of the endpoint as the source address, and encapsulate in the data message, then send the encapsulated data message to the generalized forwarding plane; if the RID of the communication peer endpoint is not searched out, tunneling encapsulate and forward the data message to the mapping forwarding plane, and notify the mapping management module to inquire the RID of the communication peer endpoint;

the second forwarding unit is set to, after receiving the data message which is to be sent to the endpoint accessing to the local ASN, remove the encapsulated RID in the data message and recover to the format of the data message sent by the communication peer endpoint to the ASN, then send the data message to the endpoint via the connection between the local ASN and the endpoint.

The access service node may also have the following feature: the ASN further comprises:

an offline processing module, which is set to, after the endpoint accessing to the local ASN is offline, inform the connection maintenance module to release the related connection between the endpoint and the network, and notify the mapping management module to remove the AID-RID mapping information of the endpoint, and notify the registration module to cancel the registration of the endpoint.

The access service node may also have the following feature: the ASN further comprises a switching control module, and the switching control module is divided into a switch-out control unit and a switch-in control unit, wherein:

the switch-out control unit is set to, when determining that the endpoint will switch to another ASN, which is called as switch-in ASN, according to the switching destination after receiving a switching request, send a switching request to the switch-in ASN, and send information of the communication peer endpoint of the endpoint to the switch-in ASN or the mapping forwarding plane, and notify the endpoint to access to the switch-in ASN after receiving a switching response, forward the data messages to be sent to the endpoint received during the switching to the switch-in ASN, and notify the mapping management module to delete the AID-RID mapping information of the endpoint after the switching is complete;

the switch-in control unit is set to, after receiving the switching request, allocate a RID to the endpoint and store the AID-RID mapping information of the endpoint, acquire the information of the communication peer endpoint of the endpoint from the switch-out ASN and return the switching response, and notify the registration module to initiate a registration process which updates the endpoint location; the switch-in control unit is further set to notify the ASNs to which all the communication peer endpoints of the endpoint access or the anchored ILR when the endpoint communicates with a Legacy IP network endpoint to update the AID-RID mapping information of the endpoint.

The aforementioned access service node may also have the following feature: the ASN further comprises:

a format conversion module, which is set to convert IPV4/IPV6 addresses of the network endpoint in the data message sent by the IPV4/IPV6 endpoint accessing to the local ASN into corresponding AIDs, and convert all AIDs in the data message which is to be sent to the IPV4/IPV6 endpoint into the IPV4/IPV6 addresses.

According to the above shortcomings of the existing technology, the present invention also provides an interconnect service node in the network based on identify identifier and location identifier separation architecture, wherein, the interconnect service node is set to inquire and maintain access identifier to routing identifier (AID-RID) mapping information of the local network endpoint, encapsulate, route and forward data messages transporting between the local network and a Legacy IP network, to achieve interconnection between the local network and the Legacy IP network.

The interconnect service node may also have the following feature: comprising a connection management module and a mapping maintenance module, wherein, the connection maintenance module is set to establish and maintain connections between the local network endpoint and the Legacy IP network endpoint, and when a local network endpoint switches, being a proxy anchor point of the endpoint between the local network and the Legacy IP network to keep the connection with the Legacy IP network;

the mapping management module is set to extract the AID-RID mapping information of the local network endpoint in the data message and maintain, and inquire a corresponding RID in the mapping forwarding plane according to the AID of the endpoint to be inquired after receiving an inquiry notification, and locally maintain inquired AID-RID mapping information.

The aforementioned interconnect service node may also have the following feature: the interconnect service node further comprises a message forwarding module, and the packet forwarding module is divided into a first forwarding unit and a second forwarding unit, wherein, the first forwarding unit is set to, according to the AID of the local network endpoint in the data message sent by the Legacy IP network, inquire the AID-RID mapping information in the local cache: if the RID corresponding to the AID of the local network endpoint is searched out, take the RID of the local network endpoint as the destination address to encapsulate in the data message, then forward the encapsulated data message to the generalized forwarding plane; if the RID corresponding to the AID of the local network endpoint is not searched out, tunneling encapsulate and forward the data message to the mapping forwarding plane, and notify the mapping management module to inquire the RID of the local network endpoint;

the second forwarding unit is set to, after receiving a data message sent by the local network, remove the encapsulated RID in the data message, and then send to the endpoint in the Legacy IP network or a format conversion module.

The Interconnect service node may also has the following feature: the interconnect service node further comprises the format conversion module which is set to convert IPV4/IPV6 addresses of the local network endpoint contained in a data message sent by the Legacy IP network into a corresponding AID, and then send to the first forwarding unit to forward; and convert the AID of the local network endpoint in the data message decapsulated by the second forwarding unit into a format of the IPV4/IPV6 addresses, and then send to the Legacy IP network endpoint.

According to the above shortcomings of the existing technology, the present invention also provides a backbone network in the network based on identity identifier and location identifier separation architecture as described in claim 1, the backbone, during networking, being divided into two planes: a generalized forwarding plane and a mapping forwarding plane, wherein, the generalized forwarding plane is set to route and forward a data message which takes a RID as a destination address according to the routing identifier (RID) in the data message;

the mapping forwarding plane is set to store access identifier to routing identifier (AID-RID) mapping information of the endpoint, and to process registration and inquiry of a endpoint location.

The aforementioned backbone network may also have the following feature:

the backbone network further comprises an access service node (ASN) which works as a boundary node between the generalized forwarding plane and the access network and between the mapping forwarding plane and the access network.

The aforementioned backbone network may also have the following feature:

the mapping forwarding plane is further set to route and forward the data message which takes the AID as the destination address.

The backbone network may also have the following feature:

the ASN is set to provide access services for the endpoints, maintain a connection between the endpoint and the network, allocate a RID to the endpoint, register the RID of the endpoint to the mapping forwarding plane and inquire the RID of the endpoint, maintain the AID-RID mapping information, and achieve the routing and forwarding of the data messages between the endpoints.

The aforementioned backbone network may also have the following feature:

network elements in the generalized forwarding plane comprise a common router which is set to route and forward the data messages whose source and destination addresses are in format of RID.

The aforementioned backbone network may also have the following feature:

the network elements in the generalized forwarding plane further comprise an Interconnect Service Node (ISN) which has interfaces to the common router, the ASN and the mapping forwarding plane, and is set to inquire and maintain the AID-RID mapping information of the endpoints in the local network, encapsulate, route and forward the data messages between the local network and a Legacy IP network, to achieve interconnection between the local network and the Legacy IP network.

The aforementioned backbone network may also have the following feature:

the backbone network further comprises a authentication center, and the authentication center has a signaling interface to the ASN and is set to record attribute information of the users in the network, to authenticate and authorize the endpoint access, or complete the authentication, authorization and accounting of the endpoint access.

The aforementioned backbone network may also have the following feature:

the mapping forwarding plane comprises an Identity Location Register (ILR), and the ILR has a signaling interface to the ASN and is set to accept a registration request and a registration cancel request, store, update, or delete the AID-RID mapping information of the home users in the network, as well as receive a request for inquiring the endpoint location, and return the RID corresponding to the endpoint AID in the request to the inquiry side.

The aforementioned backbone network may also have the following feature:

the mapping forwarding plane further comprises a packet transfer function (PTF), and the PTF has a data forwarding interface to the ASN and is set to search out the RID corresponding to the AID according to the AID of the communication peer endpoint to which the data message is sent after receiving the data message sent by the ASN, use the RID as the destination address of the data message, and send the data message to the ASN to which the communication peer endpoint accesses via the generalized forwarding plane.

The aforementioned backbone network may also have the following feature: the ILR and the PTF are in a same network element which is denoted as ILR/PTF.

According to the aforementioned shortcomings of the existing technology, the present invention also provides a mapping forwarding plane in a backbone network, wherein, the mapping forwarding plane is set to store AID-RID mapping information of the endpoint, and to process registration and inquiry of an endpoint location.

The aforementioned mapping forwarding plane may also have the following feature:

the mapping forwarding plane comprises an Identity Location Register (ILR), and the ILR has a signaling interface to the ASN and is set to accept a registration request and a registration cancel request, store, update, or delete the AID-RID mapping information of the home users in the network, as well as receive a request for inquiring the endpoint location, and return the RID corresponding to the endpoint AID in the request to an inquiry side.

The aforementioned mapping forwarding plane may also have the following feature:

the mapping forwarding plane further comprises a packet transfer function (PTF), and the PTF has a data forwarding interface to the ASN and is set to, after receiving a data message sent by the ASN, search out the RID corresponding to the AID according to the AID of the communication peer endpoint to which a data message is sent, use the RID as a destination address of the data message, and send the data message to the ASN to which the communication peer endpoint accesses via the generalized forwarding plane.

The aforementioned mapping forwarding plane may also have the following feature: the ILR and the PTF are in a same network element which is denoted as ILR/PTF.

In the aforementioned architecture, the application scene of the mobile endpoint is supported to effectively solve the problem of circuitous routing in this scene.

The deployment of the above architecture considers the demand of compatible with endpoints and compatible with upper-layer services, and it only needs to upgrade the devices at the network side, and the compatibility does not change the application scene of the endpoints.

The aforementioned architecture improves the scalability of the routing system: comprising the routing table entries in the router, the change rate of the routing table and the convergence time.

In the aforementioned architecture, the user privacy has been strengthened, both of the communication endpoints know each other's identity, but do not know each other's location, but in the Legacy Internet, the peer endpoint's location can be acquired based on the IP address.

In the aforementioned architecture, the devices in the backbone network will not be attacked, this is because the identity identifier and the location identifier are of two different namespaces, even if the user knows the location identifier of a backbone network device, the backbone network device still can not be accessed, thus preventing the backbone network devices from being attacked.

In the aforementioned architecture, common attacks such as address spoofing are eliminated. Specifically, since this architecture network authenticates each user, and authenticates the original identifier of each sent data packet, the authenticity of the user identifier is guaranteed by the network credit, thus eliminating attacks such as the address spoofing in the current network.

BRIEF DESCRIPTION OF DRAWINGS

FIG. 1 (b) is a schematic diagram of the topology of the network based on the identity and location separation architecture in accordance with another example of the present invention.

PREFERRED EMBODIMENTS OF THE PRESENT INVENTION

In the following, the technical solution of the present invention will be described in more detail with combination of the accompanying drawings and specific embodiments.

Figure 1A:
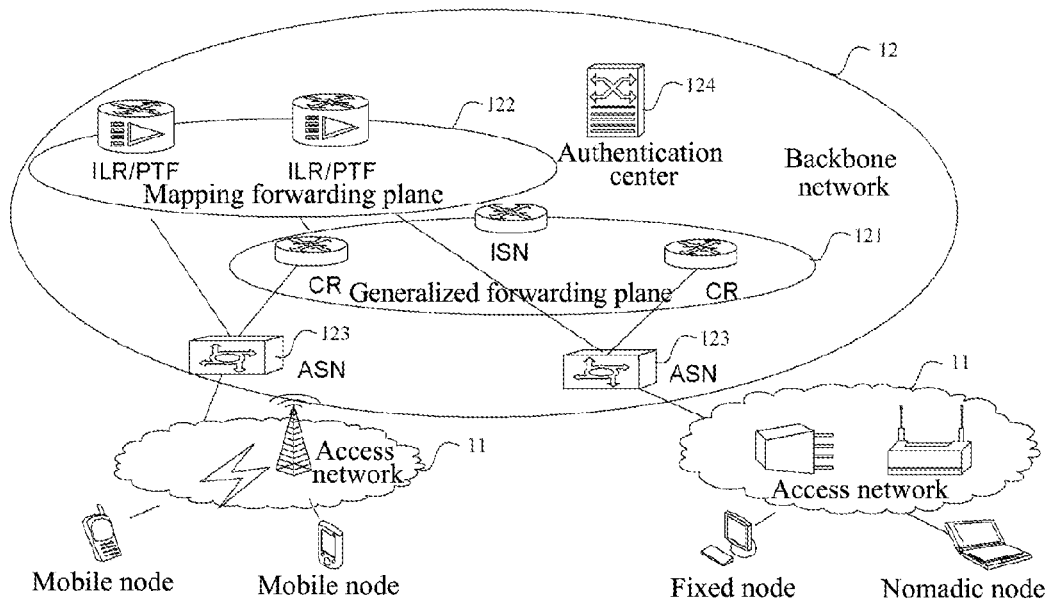
FIG. 1 (a) is a schematic diagram of the topology of network based on the identity and location separation architecture in accordance with an example of the present invention.

In this example, the topology of the network based on the identity and location separation architecture (abbreviated as the architecture) is as shown in FIG. 1(a), and the architecture divides the network into the access networks 11 and the backbone network 12. The access networks are located at the edge of the backbone network and are set to be responsible for the access of all the endpoints. The backbone network is set to be responsible for the routing and forwarding of the data messages between the endpoints that access via the access networks. The access networks and the backbone network have no overlap in the topology relationship.

In the architecture network, there are two identifier types: the access identifier (AID) and the routing identifier (RID). Wherein, the AID is the user identity identifier of the endpoint, and is set to identify the identity of the endpoint user (also abbreviated as user). The network allocates to each endpoint user a unique AID which is used in the access network and kept unchanged in the moving process of the endpoint. The RID is the location identifier allocated to the endpoint and is used in the backbone network.

In this architecture, the endpoints accessing to the network can be one or more of mobile endpoints, fixed endpoints and nomadic endpoints, such as mobile phones, fixed phones, computers, application servers, and so on.

In this architecture, the access network is used to provide the endpoints with methods for accessing to two layers (the physical layer and the link layer), and to maintain the physical access link between the endpoint and the ASN. The possible methods for accessing to the two layers comprise: the cellular mobile network technologies (GSM/CDMA/TD-SCDMA/WCDMA/WiMAX/LTE), the digital subscriber line (DSL), the broadband optical access, or wireless fidelity (WiFi) access, and so on.

In this architecture, during the networking, the backbone network 12 is divided into two planes: the generalized forwarding plane 121 and the mapping forwarding plane 122, and the backbone network 12 further comprises the access service node (ASN) 123 and the authentication center 124.

The ASNs are located in the boundary nodes of the generalized forwarding plane, the mapping forwarding plane and the access network, and have interfaces to the access networks, the generalized forwarding plane, and the mapping forwarding plane. The ASNs are set to, provide access services for the endpoints, maintain the connections between the endpoints and the network, allocate RIDs to the endpoints, register and inquire the RID of the endpoint in the mapping forwarding plane, maintain the AID-RID mapping information, and achieve the routing and forwarding of the data messages.

The generalized forwarding plane is mainly set to, route and forward data messages which take the RID in the data message as the destination address; wherein, the data routing and forwarding behavior in the generalized forwarding plane is consistent with the Legacy IP network. As shown in the diagram, the main network elements in the generalized forwarding plane comprise the common router (CR) and the interconnect service node (ISN).

The mapping forwarding plane is mainly set to, store the AID-RID mapping information of the endpoints, process the registration and inquiry of the endpoint location, route and forward the data message which take the AID as the destination address. As shown in the diagram, the main network elements in the mapping forwarding plane comprise Identifier Location Register/Packet Transfer Function (ILR/PTF).

The authentication center is set to record the attribute information, such as the user type, the authentication information and the user service grade, of the endpoint users in the network, to complete the authentication and authorization of the endpoint access, and may also have the accounting function. The authentication center supports the two-way authentication between the endpoint and the network, and can generate user security information used for authentication, integrity protection and encryption.

Figure 1B:
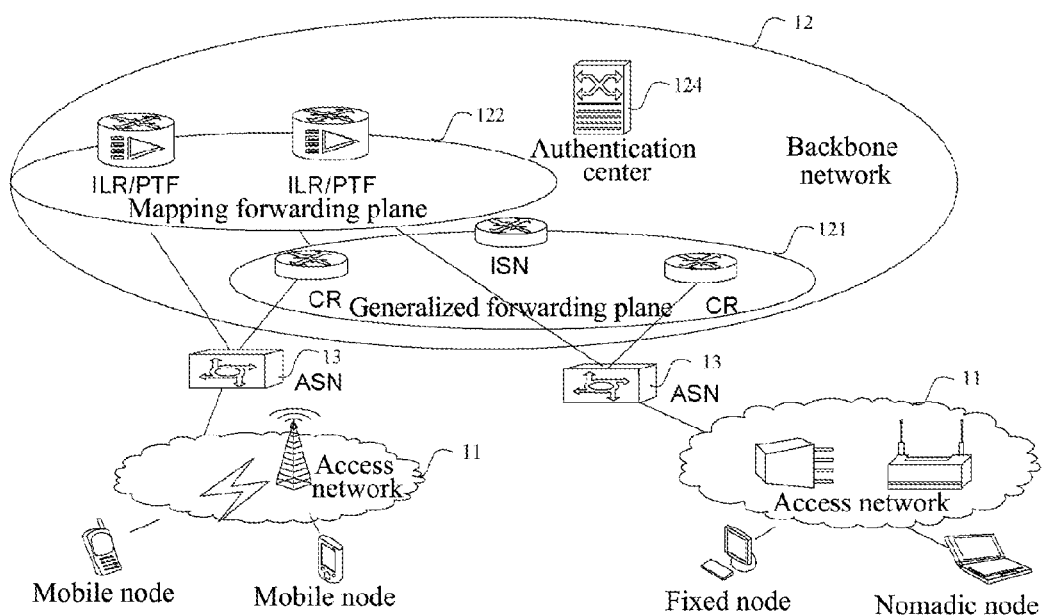

In another example, the ASN13 is independent of the backbone network 12 in the architecture division, and is located in the boundary node of the backbone network 12 and the access network 11, and the ASN13 has interfaces to the access network 11 and the backbone network 12, as shown in FIG. 1 (b). The function that ASN13 actually fulfills is the same as in this example.

Figure 2:
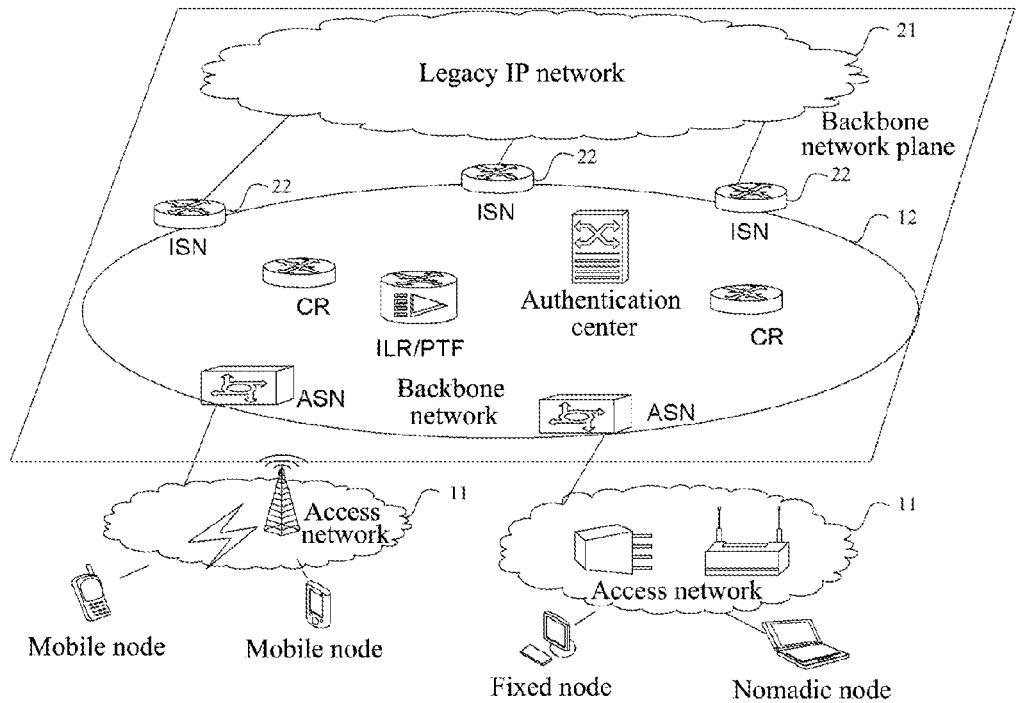
FIG. 2 is a schematic diagram of the topology relationship between the network based on the identity and location separation architecture and the Legacy IP network in accordance with an example of the present invention.

The architecture will coexist with the Legacy IP network for a long term, and the architecture may exist and develop in the form of one or more isolated islands in the Legacy IP network at the early stage, and may also be the complement and expansion part of the Legacy IP network. The topology relationship of this architecture and the Legacy IP network 21 is shown in FIG. 2, wherein, the backbone network part of this architecture is in the same plane as the Legacy IP. With the interoperability of the ISN22 and the Legacy IP network, the interface between this architecture and the Legacy IP network is compliant with specification of the inter-network interface in the Legacy IP network, and no particular changes are made, so that it does not need to make a special requirement different from the existing operating mechanism for the Legacy IP network.

This architecture has the ability of separate networking. After a long-term development, this architecture can be formed into a network which is off the Legacy IP network and develops on its own, and at this stage, the network mainly consists of the access networks, the access service nodes, the mapping forwarding plane and the generalized forwarding plane as shown in FIG. 1 (a), wherein, the function entity ISN will no longer exist.

Figure 3:
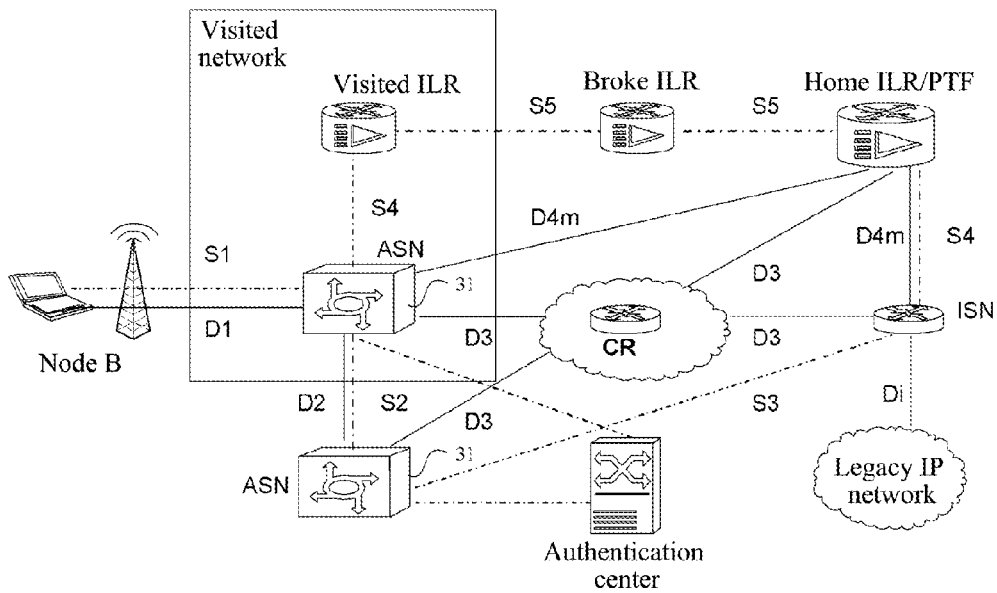
FIG. 3 is a schematic diagram of the inter-node connection relationship in the network based on the identity and location separation architecture in accordance with an example of the present invention.

A reference model of this architecture is shown in FIG. 3, which shows the main network elements in this architecture network and the connection interfaces between the network elements, wherein, the access service Node (ASN) 31 is set to provide access services to the endpoints, maintain the connections between the endpoints and the network, allocate RIDs to the endpoints, register and inquire the RIDs of the endpoint in the mapping forwarding plane, maintain the AID-RID mapping information of the endpoints, and achieve the routing and forwarding of the data messages. The ASN is further set to, cooperate with the authentication center to complete the authentication of the endpoints and the accounting of the services, as well as cooperate with other ASNs to achieve the switch across the ASNs of the endpoints.

Figure 4:
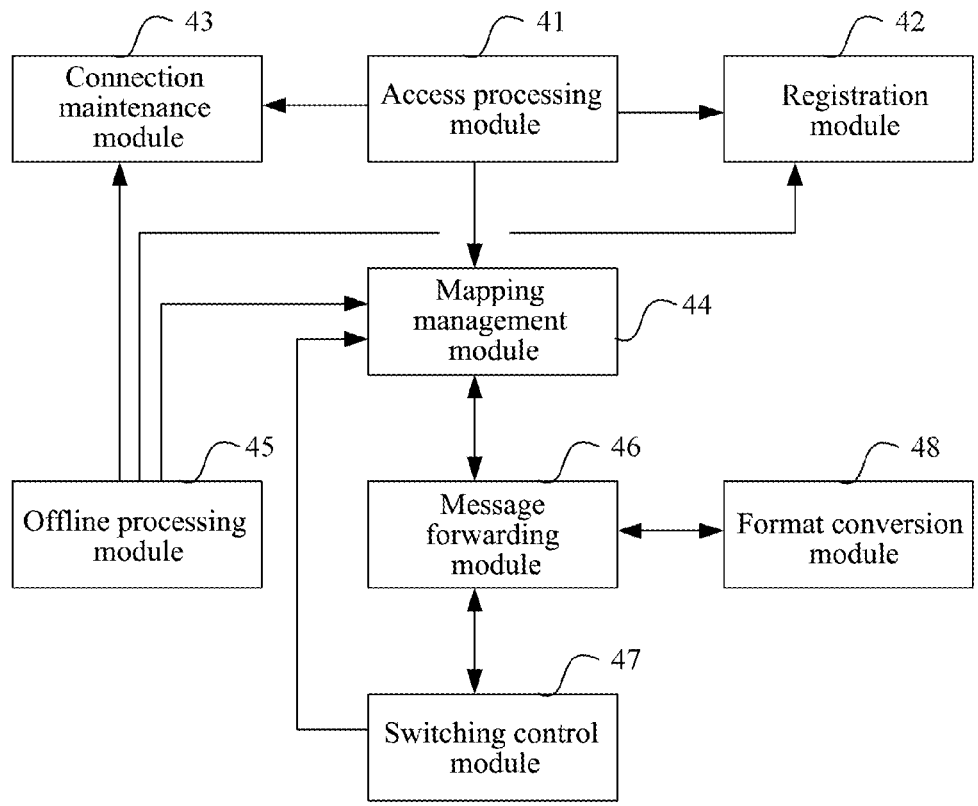
FIG. 4 is a functional block diagram of an access service node in accordance with an example of the present invention.

In this example, as shown in FIG. 4, the ASN comprises the following functional modules:

the access processing module 41, which is set to, when an endpoint requests to access, cooperate with the endpoint and the authentication center to authenticate the endpoint, establish a connection to the endpoint via the access network, allocate a RID to the endpoint, and notify the registration module to initiate the registration of the endpoint;

the registration module 42, which is set to, after receiving the notification for registering the endpoint, launch a registration carrying the current AID-RID mapping information of the endpoint to a home Identity Location Register (ILR) of the endpoint; and after receiving a notification of canceling the registration for the endpoint, notify the home ILR of the endpoint to remove the endpoint registration information, including the AID-RID mapping information of the endpoint;

the connection maintenance module 43, which is set to, during an online period after the endpoint accesses, maintain the connection between the ASN and the endpoint; and during the communication of the endpoint, maintain the connection between the local ASN and the ASN to which the communication peer endpoint accesses;

the mapping management module 44, which is set to, cache and maintain the AID-RID mapping information of the endpoint after the endpoint accesses, after receiving the inquiry notification, inquire the ILR in the mapping forwarding plane about the corresponding RID based on the AID of the communication peer endpoint, and locally maintain the queried AID-RID mapping information;

the offline processing module 45, which is set to, after the endpoint accessing to the local ASN is offline, inform the connection maintenance module to release the related connection between the endpoint and the network, and notify the mapping management module to remove the AID-RID mapping information of the endpoint, and notify the registration module to cancel the registration of the endpoint;

the message forwarding module 46, which is set to, encapsulate the data message sent by the endpoint accessing to the local ASN with the RIDs of the endpoint and the communication peer endpoint, route and forward to the ASN to which the communication peer endpoint accesses, and decapsulate the data message which is to be sent to the endpoint accessing to the local ASN and then send the decapsulated data message to the endpoint.

The message forwarding module is further divided into a first forwarding unit and a second forwarding unit, wherein:

The first forwarding unit is set to, after receiving the data message sent by the endpoint accessing to the local ASN, inquire the AID-RID mapping information in the local cache according to the AID, which works as the destination address in the data message, of the communication peer endpoint, if the RID of the communication peer endpoint is searched out, take the RID of the communication peer endpoint as the destination address, and take the RID of the endpoint as the source address, and encapsulate in the data message (such as encapsulate in the newly added third layer message header in the data message), then send the encapsulated data message to the generalized forwarding plane; if the RID of the communication peer endpoint is not searched out, tunneling encapsulate and forward the data message to the mapping forwarding plane, and notify the mapping management module to inquire the RID of the communication peer endpoint;

the second forwarding unit is set to, after receiving the data message which is to be sent to the endpoint accessing to the local ASN, remove the encapsulated RID in the data message and recover to the format of the data message sent by the communication peer endpoint to the ASN, then send the data message to the endpoint via the connection between the local ASN and the endpoint.

The switching control module 47 is divided into a switch-out control unit and a switch-in control unit, wherein, the switch-out control unit is set to, when determining that the endpoint will switch to another ASN, which is called as switch-in ASN, according to the switching destination after receiving a switching request, send a switching request to the switch-in ASN, and notify the endpoint to access to the switch-in ASN after receiving a switching response, forward the data messages to be sent to the endpoint received during the switching to the switch-in ASN, and notify the mapping management module to delete the AID-RID mapping information of the endpoint after the switching is complete; it may also be set to, send the information of the communication peer endpoint of this endpoint to the switch-in ASN or the mapping forwarding plane in the switching process;

the switch-in control unit is set to, after receiving the switching request, allocate a RID to the endpoint and store the AID-RID mapping information of the endpoint, acquire the information of the communication peer endpoint of the endpoint from the switch-out ASN and return the switching response, and notify the registration module to initiate a registration process which updates the endpoint location; the switch-in control unit is further set to notify the ASNs to which all the communication peer endpoints of the endpoint access or the anchored ILR when the endpoint communicates with a traditional IP network endpoint to update the AID-RID mapping information of the endpoint.

This architecture network is compatible with the IPV4/IPV6 endpoints (referring to the endpoints supporting the IPV4/IPV6 protocol stack in the existing Legacy IP network), and when the format of the AID is different from that of the IPV4/IPV6 address, the ASN needs the proxy IPV4/IPV6 endpoint to achieve the compatibility processing of the network AID data messages with the IPV4/IPV6 data messages. In order to do this, a format conversion module 48 is needed to be added in the ASN, and the format conversion module 48 is set to convert the IPV4/IPV6 addresses of this architecture network endpoint in the data messages (may be the source address or the source address and the destination address)

sent by the IPV4/IPV6 endpoint accessing to the local ASN into the corresponding AIDs, as well as convert all the AIDs in the data messages to be sent to the IPV4/IPV6 endpoint into the IPV4/IPV6 addresses. A conversion instance can be referenced to the following description.

The common Router (CR) is located in the generalized forwarding plane of the backbone network and is set to route and forward the data message whose source and destination addresses are in RID format. The function of the common router is the same as the router in the existing technology.

The Identity Location Register and the packet transferring function (ILR/PTF) are located in the mapping forwarding plane of the backbone network, and they are two function modules in the same entity in this example, but they can also be located in different entities.

The ILR is the identity location register, which is set to accept the registration request and the registration cancel request, store, update, or delete the AID-RID mapping information of the home users in this architecture network, as well as receive the request for inquiring the endpoint location, and return the RID corresponding to the endpoint AID in the request to the inquiry side.

The PTF is the packet transfer function, and is set to, after receiving the data message sent by the ASN, search out the corresponding RID according to the AID of the communication peer endpoint to which the data message is sent (if the searching is performed at ILR, a copy of the mapping relationship may be locally stored), encapsulate the RID to the message header, and send the data message to the ASN to which the communication peer endpoint accesses via the generalized forwarding plane; if it is not the home PTF, firstly route the data message to the home ILR/PTF, which then searches out the corresponding RID according to the AID.

The interconnection service node is set to inquire and maintain the access identifier to routing identifier (AID-RID) mapping information of this architecture network endpoint, encapsulate, route and forward the data message transmitting between this architecture network and the Legacy IP network, to achieve the interconnection between this architecture network and the Legacy IP network.

Figure 5:
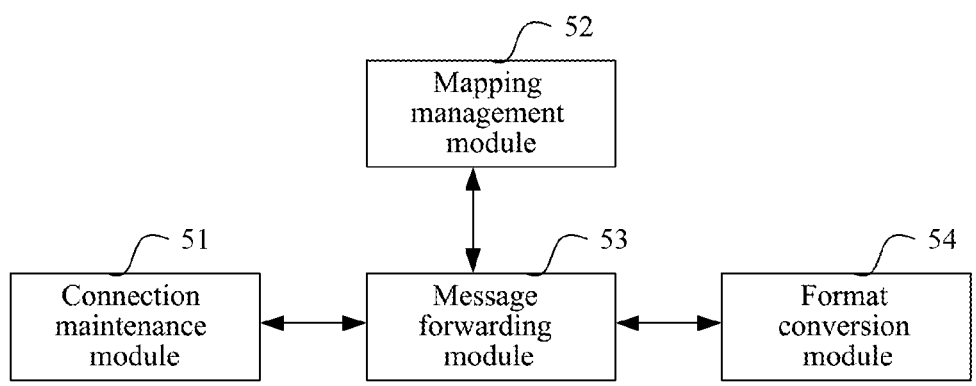
FIG. 5 is a functional block diagram of an interconnect service node in accordance with an example of the present invention.

As shown in FIG. 5, the ISN comprises the following functional modules:

the connection maintenance module 51, which is set to establish and maintain the connection between the local architecture network endpoint and the Legacy IP network endpoint, and when the local network endpoint switches, work as the proxy anchor point of the endpoint between this architecture network and the Legacy IP network to keep the connection with the Legacy IP network;

the mapping management module 52, which is set to extract and maintain the AID-RID mapping information of the local architecture network endpoint in the data message, and inquire the ILR in the mapping forwarding plane about the corresponding RID according to the AID of the endpoint to be inquired after receiving the inquiry notification, and locally maintain the inquired AID-RID mapping information;

the message forwarding module 53 is further divided into the first forwarding unit and the second forwarding unit, wherein, the first forwarding unit is set to, according to the AID of the local architecture network endpoint in the data message sent from the Legacy IP network (as the destination address or being acquired by converting the destination address), inquire the AID-RID mapping information in the local cache: if the RID corresponding to the AID of this architecture network endpoint is searched out, taking the RID of the local architecture network endpoint as the destination address to be encapsulated in the data message (such as encapsulated in the newly added third layer message header), then forward the encapsulated data message to the generalized forwarding plane; if the RID corresponding to the AID of the local architecture network endpoint is not searched out (for example, the data message is the initial packet or the data message with default routing), tunneling encapsulating and forwarding the data message to the mapping forwarding plane, and notifying the mapping management module to inquire the RID of the local architecture network terminal;

the second forwarding unit is set to, after receiving the data message sent by the local architecture network, remove the encapsulated RID in the data message, and send to the Legacy IP network or the format conversion module 54.

When the format of the AID applied by the architecture network is different from that of the IPV4/IPV6 address, the ILR further comprises a format conversion module 54 which is set to convert the IPV4/IPV6 address of the local network endpoint contained in the data message sent by the Legacy IP network into the corresponding AID, and then send to the first forwarding unit to forward; and convert the AID of the local network endpoint in the data message decapsulated by the second forwarding unit into the format of the IPV4/IPV6 address, then send to the Legacy IP network endpoint.

As shown in FIG. 3, the main interfaces in this architecture comprise:

S1/D1 interface, the interface (or called as the reference point) between the endpoint and the ASN. Wherein, the S1 is the signaling interface, which is mainly used for processing message flows such as access management, switching, authentication, accounting and registration, between the endpoint and the ASN, the D1 is the data transmit-receive interface between the endpoint and the ASN. For endpoints compatible with this architecture network, the format of the data message at the D1 interface is:

| The second layer header | Source AID | Destination AID | Data message payload... |
|---|---|---|---|

Wherein, the source AID is the AID of the endpoint sending the data packet and works as the source address of the data message; the destination AID is the AID of the communication peer endpoint to which the data packet is sent and works as the destination address of the data message, and both the source address and the destination address are encapsulated in the third layer header.

S2/D2 interface is the interface between the ASNs, wherein, the S2 is mainly used for transferring the switching management signaling during the switching, and transferring the RID update message when the location between the communication peer endpoints changes;

the D2 is mainly used for forwarding data between the ASNs during the switching. The format of the data message at the D2 interface is:

| The second layer header | Tunneling encapsulation | Source AID | Destination AID | Data message payload... |
|---|---|---|---|---|

The ASN adds the tunneling encapsulation on the data message before forwarding the data message, there are many modes for tunneling encapsulation, such as L2TPv3, IP-in-IP, MPLS (LDP-based and RSVP-TE based), GRE, IPsec, and so on, and the present invention is not limited to any particular tunnel encapsulation mode.

The S3 is the signaling interface between the ASN and the ISN. In the communication process between the architecture network endpoint and the Legacy IP network endpoint, if the architecture network endpoint switches, the ASN informs the ISN of the new AID-RID mapping information of the architecture network endpoint via the S3 interface.

The D3 is the external interface of the generalized forwarding plane, and the format of data message at the D3 interface is:

| The second layer header | Source RID | Destination RID | Source AID | Destination AID | Data message payload |
| --- | --- | --- | --- | --- | --- |

The data message at the D3 interface is newly encapsulated a third layer header on the basis of the data message at the D1 interface, and the new third-layer header comprises the source RID and the destination RID, wherein, the source RID is the RID allocated to the endpoint sending the data packet, and the destination RID is the RID allocated to the communication peer endpoint to which the data packet is sent. However, the encapsulation mode is not unique.

S4 is the signaling interface between the ASN and the mapping forwarding plane, and is mainly used to inquire and maintain the AID-RID mapping information.

The D4m is the data forwarding interface between the ASN and the mapping forwarding plane, and the format of the data message at the D4m interface is:

| The second layer message header | Source RID | RIDi | Source AID | Destination AID | Data message payload |
| --- | --- | --- | --- | --- | --- |

The data message at the D4m interface is also newly encapsulated a third layer header on the basis of the data message at the D1 interface, and the source address in the new third-layer header is the source RID, and the destination address is the RIDi, wherein, the source RID is the RID allocated to the endpoint sending the data packet, and the RIDi, acquired from the configuration data in the ASN, is the routing address of the ILR/PTF in the mapping forwarding plane connected with the ASN.

S5 is the signaling interface between the ILRs in the mapping forwarding plane, and is mainly used to inquire and maintain the AID-RID mapping information and exchange the routing information in the mapping forwarding plane.

The Di interface is the data forwarding interface between this architecture network and the Legacy IP network, and the format of the data message at the Di interface is the same as the data message in the Legacy IP network, as follows:

| The second layer message header | Source IPV4/IPV6 | Destination IPV4/IPV6 | Data message payload . . . |
| --- | --- | --- | --- |

The numbering mechanism and action scope of AID and RID will be described in the following.

In this architecture network, the AID uniquely identifies a user identity, and the AID is used to identify the endpoint users in this architecture network.

The factors considered for the AID coding mode may be one or more of the following factors:

the maximum coding length should meet the needs of the largest number of users;

the endpoint in the network architecture based on identity and location separation architecture needs to access the applications in the Legacy IP network, so it requires to interconnect with the Legacy IP network, and the AID coding space cannot have ambiguity with the IPV4 address space in the Legacy IPV4 network, so as to uniquely distinguish the communication peed endpoint which is accessed to;

meet the operating management requirements: carrying the information of nation, region and operator;

comprise the home routing information so that the visited identifier location register (Visited ILR) can search out the home mapping server (Home ILR) according to the AID; the ASN can route the first message or data message with the default routing to the home packet transferring function (Home PTF) based on the AID.

The AID coding in this architecture network can follow the IP address coding allocation scheme in the Legacy IP network. In an application example, the AID uses the public or private network address of the IPV4 in the Legacy IP network. The AID coding in this architecture network follows the IPV4 address coding allocation scheme in the Legacy IP network, in this case, this architecture network can be a component in the Legacy IP network, and when the AID uses the public network IPV4 address space, the AID directly communicates with the Legacy IPV4 network, when the AID uses the private network IP address space, the private network IP address space should be translated to the public network IPV4 address space via the Network Address Translation (NAT) gateway so as to communicate with the Legacy IP network. In another application example, the AID uses the IPV6 address in the Legacy network, and the AID coding in this architecture network follows the IPV6 address coding allocation scheme in the Legacy IPV6 network. The public network IPV6 address can be directly used to communicate with the Legacy IP network, or the private IPV6 network address can be converted into the public network IPV6 address space by the NAT gateway to communicate with the Legacy IP network.

When the format of the AID is different from the format of the IPV4/IPV6 address, in order to facilitate the conversion, the AID may be set to be in a format that the AID is one-to-one corresponding to and interrelated with the IPV4/IPV6 public network address, so that the AID can be directly converted into the corresponding IPV4/IPV6 public network address via a specified conversion algorithm, and the IPV4/IPV6 public network address can be directly converted into the corresponding AID by another specified conversion algorithm. In another application example, the AID coding format is: Expand Header+suffix. The suffix part uses the IPV4/IPV6 public network address, and the value of the expand header is a constant determined for this architecture network during the period that the Legacy IP network co-exists with this architecture network, so that the corresponding IP address can be acquired by removing the expand header of the AID, and the corresponding AID can be acquired by adding the constant as the expand header to the IP address. As a modification of this example, the AID coding format can use the format of the IPV4/IPV6 public network address plus a constant as the suffix. Of course, it is also able to store the AID to the IPV4/IPV6 public network address mapping information in a certain network element when the ASN, the ILR or other network elements that need to convert can inquire the mapping information.

In this architecture network, the numbering of RID may use the IPV4/IPv6 address format generally supported by the routers in the existing Legacy IP network to mark the location of the ASN where the endpoint is currently located. The RID action scope is in the generalized forwarding plane in the backbone network of this architecture network.

This architecture backbone network uses the data message format to route and forward. When the endpoint registers to the network or switches, the ASN allocates a RID to the endpoint according to the specified policy, and the RID allocated by the ASN should point to this ASN. According to the service needs, the ASN may allocate one or more dedicated RIDs to one endpoint, or allocate the same RID to a plurality of endpoints.

The architecture is based on the location and identity separation technical principle. The main factors affecting the network topology in the generalized forwarding plane are the number of functional entities such as the ASNs, the ISNs, and so on, and their deployments, and the location change of the access endpoint has no direct relationship to the network topology, so as to eliminate the impact of mobility of the endpoint host on the scalability of the routing system. In the Legacy IP network, the routing basis is the IP address, which is basic one-to-one corresponding to the number of the communication hosts, and the size of the routing table is positively related to the number of communication hosts. Especially in the IPV4/IPV6 dual protocol stack scene, the size of the routing table grows exponentially. Larger routing table and more frequent change will result in the increased routing convergence time. In the generalized forwarding plane of this architecture, the RID is taken as the routing basis, and the ASN and the ISN may allocate the same one RID, which indicates the locations of the ASN and the ISN, to multiple access users. From this perspective, the number of routing entries in the generalized forwarding plane is mainly positively related to the number of the ASNs and the ISNs, thus reducing the association with the number of access users. The complexity of the network topology is reduced by addressing the mobility problem, and the relevance between the routing table size and the number of access users is reduced by sharing the RID among multiple access endpoints, thereby enhancing the scalability of the routing system.

In the following, the specific operating mode of the network will be described, the normal operation of the architecture network comprises the main processing as follows: the processing for opening an account for and allocating a number to the user, the processing for the endpoint booting up and accessing to the network, the processing for updating the endpoint location and registration, the processing for the endpoint communication, the processing for the endpoint switching, the process for the endpoint offline. All the processes will be described one by one in the followings.

(1) The Processing for Opening an Account for and Allocating a Number to the User After a user subscribes and becomes a user in this architecture network, operations of opening an account and allocating a number are performed in the home authentication center and the home ILR, and the authentication center and the ILR will create a user record for this user to record the attribute data of the user, including the AID allocated to the user.

After the processing of opening an account and allocating a number is completed, the AID is statically allocated to the user, and the user AID keeps unchanged during the valid existence of the user.

When the user uses the endpoint to communicate in this architecture network, the mode for configuring the AID for the endpoint may be one of the following two, and different modes can be used for different endpoints.

The first is a form of network configuration, that is, the user AID is stored in the authentication center, and when an endpoint is authenticated, the user identifier is sent to the authentication center, and then the authentication center sends the AID together with the user identifier to the ASN, which stores the AID and sends to the endpoint. When the endpoint is an IPV4/IPV6 endpoint, the ASN needs to convert the AID into the corresponding IPV4/IPV6 address and then send the address to the endpoint.

The networks with different modes have different user identifiers, for example, it is the International Mobile Subscriber Identity (IMSI) in the cellular mobile network, and the NAI or Username when accessing in the fixed networks such as the ADSL.

The second is the mode of endpoint configuration, that is, storing the AID in the user identity module (such as SIM cards, UIM cards, and so on) of the endpoint, and when the endpoint accesses to the network, the AID is sent to the ASN which stores the endpoint AID. The AID endpoint (refer to the endpoint whose protocol stack supports the AID coding requirements) directly uses the AID to be the source address in the sent data message, and the source address in the data message sent by the IPV4/IPV6 endpoint uses the IPV4/IPV6 address corresponding to the endpoint AID, and the ASN converts the IPV4/IPV6 address into the corresponding AID.

(2) The Processing for the Endpoint Accessing to the Network

After being booted, the endpoint initiates a process of accessing to the network, the process comprising: the endpoint sending the ASN a request message to request for accessing via the access network; the ASN, the authentication center, and the endpoint working together to complete the authentication of the endpoint; after the authentication is passed, a connection is established between the ASN and the endpoint. In the access process, the ASN further needs to allocate a RID to the endpoint, store the AID-RID mapping information of the endpoint in the local cache, and initiate a registration process to the home ILR/PTF of the endpoint user, and after the registration, the ILR/PTF stores the current AID-RID1 mapping information of the endpoint.

When the endpoint is online, the ASN will store the connection relationship information of this connection, and the connection relationship information comprises the endpoint AID. With this connection relationship, the ASN can send the data message whose destination address is this AID to the endpoint. In one example, the connection established between the ASN and the endpoint may be a point-to-point connection. When the access network is the global system for mobile communications (GSM), the WCDMA or the Time Division Synchronous Code Division Multiple Access (TD-SCDMA) mobile mode, the point-to-point connection relationship is the GTP connection. When the access network is in the CDMA mobile mode and the fixed broadband access network, the point-to-point connection relationship is the Point to Point Protocol (PPP) connection. Within the ASN, a point-to-point connection corresponds to an endpoint, and for the establishment and maintenance of the connection relationship, the existing network mechanism can be used to meet the requirements of the present invention.

In addition to being booted, in scenes such as the endpoint switching to a new ASN, or reconnecting the network after the connection is interrupted, the process of accessing to the network, which also needs the authentication, is basically the same as the above process of accessing to the network after being booted. However, if the ASN still stores the AID-RID mapping information of the endpoint, it does not need to reallocate the RID or initiate the registration process.

(3) The Processing for Updating the Endpoint Location

When the endpoint location changes, that is, the endpoint moves from one ASN coverage to a new ASN to access, the new ASN will allocate a new RID to the endpoint, store the endpoint AID to the newly allocated RID mapping information in the local cache, and initiate a registration process to the home ILR/PTF of the user endpoint, and the home ILR/PTF updates the location information in the identity and location mapping information of the endpoint to the newly allocated RID.

(4) The Processing for Endpoint Communication

In the following, the processing of the endpoint initiating a communication will be described, in order to be more clearly expressed, taking the endpoint MN communicating with the endpoint CN for example, the endpoint CN and the endpoint MN are each other's communication peer endpoint, and both of them are AID endpoints. The AID and RID of the endpoint MN are denoted as AIDm and RIDm respectively, and the AID and RID of the communication peer endpoint CN are denoted as AIDc and RIDc respectively.

The processing when the ASN receives a data message sent by the endpoint (assumed to be endpoint MN) accessing to the local ASN is as follows.

In the data message sent by the endpoint MN to the communication peer endpoint, the source address is AIDm and the destination address is AIDc. The endpoint MN may acquire the AID of the peer endpoint by analyzing through the domain name server or searching locally the corresponding relationship between the AID and the user name or other modes.

After the ASN receives the data message sent by the endpoint MN (the format of the data message is the format defined by the D1 interface), the ASN inquires the AID-RID mapping table in the local cache according to the AIDc in the data message.

If the corresponding AIDc-RIDc mapping entry is searched out, the ASN converts the format of the data message from that defined by the D1 interface to the one defined by the D3 interface (that is, taking the RIDm corresponding to the AIDm as the source address, and taking the RIDc as the destination address, both of them are encapsulated in the newly added third-layer header) and then forwards the data message to the generalized forwarding plane, and the generalized forwarding plane sends the data message to the ASN to which the communication peer endpoint accesses.

If the corresponding AIDc-RIDc mapping entry is not searched out (for example, it is the first message or a message with the default routing), the ASN converts the format of the data message defined by the D1 interface into the format defined by the D4m interface (that is, taking the RIDm corresponding to the AIDm as the source address, and taking the RIDi of the ILR in the mapping plane connecting to the ASN as the destination address, both of them are encapsulated in the newly added third-layer header) and then forwards to the mapping forwarding plane, and sends a request for inquiring the AIDc-RIDc mapping information to the mapping forwarding plane. After the mapping forwarding plane receives the request, the mapping forwarding plane returns the AIDc-RIDc mapping information to the ASN, and the ASN receives and stores the AIDc-RIDc mapping information in the local cache. After the mapping forwarding plane receives the data message sent by the ASN, the mapping forwarding plane searches out the corresponding AIDc-RIDc mapping entry, and converts the format of the data message from the D4m interface format into the D3 interface format (that is, replacing the RIDi in the newly added message header with the RIDc) and then forwards to the generalized forwarding plane, and the generalized forwarding plane sends the message to the communication peer endpoint CN.

In the aforementioned process, the generalized forwarding plane specifically forwards the data message by the CR. In the case that the corresponding AIDc-RIDc mapping entry is not searched out, the ASN firstly sends the inquiry request to the connected visited ILR, and when the visited ILR and the home ILR of the endpoint CN are not the same ILR, the visited ILR transfers messages between the ASN and the home ILR. When the visited ILR and the home ILR have no direct connection, the Broke ILR is further needed to relay. For a data message, the ASN forwards the data message to the adjacent PTF in the mapping forwarding plane, and the adjacent PTF routes the data message to the home PTF. Optionally, for a data message, the ASN may cache and query the data messages during inquiring the mapping of the communication peer endpoint, and encapsulates the data message headers with the RID and then sends the data message out via the generalized forwarding plane, after the home ILR returns the mapping of the communication peer endpoint.

In another embodiment, in the case when the ASN does not search out the corresponding AIDc-RIDc mapping entry, it can also only inquire the mapping forwarding plane about the AIDc-RIDc mapping information, and cache the received data message, after the AIDc-RIDc mapping information is searched out, convert the cached data message from the format defined by the interface D1 to the format defined by the interface D3, and then forward the data message to the generalized forwarding plane.

The processing when the ASN receives the data message sent to the endpoint accessing to the local ASN (assumed to be the endpoint MN) comprises:

when receiving a data message sent by the network to the endpoint MN, the ASN decapsulating the data message and removing the newly added message header of the data message, converts the data message from the format defined by the D3 interface to the format defined by the D1 interface, and then send the data message to the endpoint MN.

If the local cache does not store the corresponding AID-RID mapping information when the ASN receives a data message sent by the communication peer endpoint to the endpoint MN (such as the first data message sent by the communication peer endpoint initially to the endpoint MN), the ASN needs to acquire and cache the AID-RID mapping information of the peer endpoint in the data message.

The above only describes the processing on the ASN to which the endpoint MN accesses, and the processing logic of the ASN to which the endpoint CN accesses after this ASN receives the data message is the same, therefore, the whole process of data message sending can be understood.

For still another example of the present invention, the ASN may also use another method to encapsulate the received data message which will be sent to the communication peer endpoint: replacing the source address AIDm in the message header with the RIDm, replacing the destination address AIDc with RIDc, and encapsulating the AIDm and the AIDc into the payload of the data message. Accordingly, when receiving a data message which will be sent to the endpoint MN, the ASN needs to extract the AIDm and the AIDc from the payload of the data message, and replace the source address RIDm in the message header with the AIDm, and the destination address RIDc with the AIDc, that is, recover to the format defined by the D1 interface, and then send to the communication peer endpoint.

When the AID format is not the same as the IP address format, the communication between the IPV4/IPV6 endpoints in this architecture network or the communication between the IPV4/IPV6 endpoint and the AID endpoint is basically the same as the above process, where the difference is that the source address and the destination address in the data message sent by the IPV4/IPV6 endpoint to the ASN are the IPV4/IPV6 addresses, and the ASN needs to firstly convert these IPV4/IPV6 addresses into the corresponding AIDs and then processes; while when receiving a data message sent to the IPV4/IPV6 endpoint, the ASN needs to firstly convert the AIDs in the data message into the corresponding IPV4/IPV6 addresses and then sends the data message to the IPV4/IPV6 endpoint.

(5) The Process when the Endpoint Switches

Still take the endpoints MN and CN for example to illustrate the switching process of the endpoint. The data forwarding path used when the endpoints MN and CN are communicating is MN<-->ASNm1<-->ASNc<-->CN, and the ASNm1 is the ASN to which the endpoint MN accesses, and the ASNc is the ASN to which the endpoint CN accesses, the AID of the endpoint MN is denoted as AIDm, and the RID allocated by the ASNm1 to the endpoint MN is denoted as RIDm1.

In the communication process, the location of endpoint MN changes and moves to the ASNm2 service area, the access network and/or the endpoint will trigger the switching process, and switch the endpoint MN from the ASNm1 (referred to as the switch-out ASN) to the ASNm2 (called as the switch-in ASN).

In the switching process, the ASNm1 requests the ASNm2 for switching, the ASNm2 needs to allocate a new RID, denoted as RIDm2, to the endpoint MN, store the AIDm-RIDm2 mapping information, acquire the information of the communication peer endpoint stored in the ASNm1, and return a response to the ASNm1. In order to maintain the service continuity, the ASNm1 forwards data to the ASNm2 during the switching, and the data forwarding path is the MN<-->ASNm2<-->ASNm1<-->ASNc<-->CN. The ASNc needs to acquire the new AIDm-RIDm2 mapping information of the endpoint MN from the ASNm2 or the mapping forwarding plane, and after the endpoint MN accesses to the ASNm2, the data forwarding path changes to MN<-->ASNm2<-->ASNc<-->CN. In or after the switching process, the ASNm2 needs to report the AIDm-RIDm2 mapping information to the home ILR of the endpoint MN; and the home ILR/PTF updates the stored identity and location mapping entry AIDm-RIDm1 to AIDm-RIDm2.

(6) The Process for Endpoint Offline

When an endpoint shuts down or is offline, the endpoint sends a notification message to the accessed ASN, after the ASN receives the notification message, the ASN deletes the connection between the endpoint and the network (including the connection between the D1 interface and the D3 interface), and notifies the home ILR of the endpoint user to cancel the registration of the endpoint. After receiving the notification message, the home ILR deletes the stored AID-RID mapping entry of the endpoint.

If the ASN does not detect the activities of an endpoint for a long time (such as the time surpasses the preset time threshold), the ASN can delete the endpoint connection, and notifies the home ILR of the endpoint user to cancel the registration of the endpoint. After receiving the message, the home ILR deletes the stored AID-RID mapping entry of the endpoint.

INDUSTRIAL APPLICABILITY

The network based on identity identifier and location separation architecture based and each component in the network provided in the present invention achieve the network based identity identifier and location separation, and the aforementioned architecture may support the application scene of the mobile endpoint to effectively solve the problem of circuitous routing in this scene. The deployment of the architecture considers the needs to be compatible with endpoints and upper-layer services, and it only needs to upgrade the equipments at the network side, and the compatibility does not change the application scene of the endpoint. The aforementioned architecture improves the scalability of the routing system: comprising the routing table entries in the router, the change rate of the routing table and the convergence time. In the aforementioned architecture, the user privacy has been strengthened, both of the communication ends only know each other's identity, but do not know each other's location, and in the Legacy Internet, the peer endpoint's location can be acquired based on the IP address. In the aforementioned architecture, the devices in the backbone network will not be attacked, which is because the identity identifier and the location identifier are two different namespaces, the backbone network device can not be accessed even if the user knows the location identifier of the backbone network device, thus preventing the backbone network equipment from being attacked. In the aforementioned architecture, common attacks such as address spoofing are eliminated, which is because this architecture network authenticates each user, and authenticates the source identity of each sent data packet, and the authenticity of the user identity is guaranteed by the network credit, thus eliminating attacks such as the address spoofing existing in the current network.

What is claimed is:

1. A network based on identity identifier and location identifier separation architecture, the network comprising an access network and a backbone network, and the access network and the backbone network having no overlap in topology relationship, wherein:

the access network is located at an edge of the backbone network, and is set to achieve accessing to the access network of an endpoint;

the backbone network is set to achieve routing and forwarding of a data message between the endpoint and other endpoint which access to the backbone network via the access network;

in the network, an access identifier (AID) is taken as an identity identifier of an endpoint user, and a routing identifier (RID) is used as a location identifier of the endpoint;

the backbone network is divided into two planes during networking: a generalized forwarding plane and a mapping forwarding plane;

the generalized forwarding plane is set to route and forward the data message which take the RIDs as destination addresses according to the RIDs in the data message;

the mapping forwarding plane is set to store AID-RID mapping information of the endpoint, to process registration and inquiry of a location of the endpoint, and to route and forward the data message which take the AID as the destination address;

the network further comprises an access service node (ASN), the ASN is included in the backbone network, the ASN is located in the boundary nodes of the generalized forwarding plane, the mapping forwarding plane and the access network, and has interfaces to the access network, the generalized forwarding plane, and the mapping forwarding plane; or the ASN is independent of the backbone network, and is located in the boundary node of the backbone network and the access network, and the ASN has interfaces to the access network and the backbone network;

the ASN is set to provide access services for the endpoint, maintain connections between the endpoint and the network, allocate the RID to the endpoint, register the RID of the endpoint to and inquire the RID of the endpoint in the mapping forwarding plane, maintain the AID-RID mapping information, and achieve the routing and forwarding of the data message between the endpoint and the other endpoint;

when there are more than one ASNs, there are a signaling interface and a second data forwarding interface between the ASNs, and the signaling interface between the ASNs is set to switch transmission of the management signaling during the switching, and deliver a RID update message when the location between the communication peer endpoint changes; the second data forwarding interface is set to forward data between the ASNs during the switching, wherein, the data message at the second data forwarding interface includes the tunneling encapsulation.

2. The network of claim 1, wherein:
a unique AID is allocated to each endpoint user in the network, wherein, the AID is used in the access network and always remains the same during moving of the endpoint; the RID is the location identifier allocated to each endpoint in the network and is used in the backbone network.

3. The network of claim 1, wherein:
the access network is set to provide the endpoint with methods for accessing to a physical layer and a link layer, and to maintain physical access links between the endpoint and the ASN.

4. The network of claim 1, wherein:
network elements in the generalized forwarding plane comprise a common router, which is set to route and forward the data message whose source and destination addresses are in format of RID.

5. The network of claim 4, wherein:
the network elements in the generalized forwarding plane further comprise an Interconnect Service Node (ISN) which has interfaces to the common router, the ASN and the mapping forwarding plane and is set to inquire and maintain the AID-RID mapping information of the endpoint in the network, encapsulate, route and forward the data message between the network and a Legacy IP network, to achieve the interconnection between the network and the Legacy IP network.

6. The network of claim 5, wherein:
the signaling interface between the ASN and the ISN is set for the ASN to notify the ISN of the new AID-RID mapping information of the endpoint.

7. The network of claim 5, wherein:
there is a data forwarding interface between the ISN and the Legacy IP network, the data message at this data forwarding interface has the same format as the data message in the Legacy IP network.

8. The network of claim 1, wherein:
the backbone network further comprises an authentication center, and the authentication center has signaling interfaces to the ASN and is set to record attribute information of the users in the network, complete authentication and authorization of the endpoint access, or complete the authentication, authorization and accounting of the endpoint access.

9. The network of claim 8, wherein:
the interfaces between the ASN and the mapping forwarding plane comprise a signaling interface and a fourth data forwarding interface, the signaling interface between the ASN and the mapping forwarding plane is set to inquire and maintain the AID-RID mapping information; the data message at the fourth data forwarding interface is newly encapsulated a third-layer header on the basis of the data message at the first data transmit-receive interface, the source address in the new third-layer header is the RID allocated to the endpoint which sends the data packet, and the destination address is the routing address of the network element which is responsible for forwarding the data messages in the mapping forwarding plane that is connected to the ASN.

10. The network of claim 1, wherein:
the mapping forwarding plane comprises an Identity Location Register (ILR), and the ILR has signaling interface to the ASN and is set to accept a registration request and a registration cancel request, store, update, or delete the AID-RID mapping information of the home users in the network, as well as receive the request for inquiring the location of the endpoint, and return the RID corresponding to the AID of the endpoint in the request to an inquiry side.

11. The network of claim 10, wherein:
the mapping forwarding plane further comprises a packet transfer function (PTF), and the PTF has a data forwarding interface to the ASN and is set to, after receiving the data message sent by the ASN, search out the RID corresponding to the AID according to the AID of the communication peer endpoint to which the data message is sent, and use the RID as the destination address of the data message, and send the data message to the ASN to which the communication peer endpoint accesses via the generalized forwarding plane.

12. The network of claim 11, wherein, the ILR and the PTF are located in the same network element which is denoted as ILR/PTF.

13. The network of claim 10, wherein,
there is a signaling interface between the ILRs in the mapping forwarding plane, and the signaling interface is set to inquire and maintain the AID-RID mapping information and exchange routing information in the mapping forwarding plane.

14. The network of claim 1, wherein, there are a signaling interface and a first data transmit-receive interface between the ASN and the endpoint, and the signaling interface between the ASN and the endpoint is set to process information flow of access management, switching, authentication, accounting and registration; in the data message at the first data transmit-receive interface, the source address is the AID of the endpoint which sends a data packet, and the destination address is the AID of the communication peer endpoint to which the data packet is sent.

15. The network of claim 14, wherein: the generalized forwarding plane has a common router, and the external interface of the common router is the third data forwarding interface, and the data message at the third data forwarding interface is newly encapsulated a third-layer header on the basis of the data message at the first data transmit-receive interface, the source address in the new third-layer header is the RID allocated to the endpoint which sends the data packet, and the destination address is the RID allocated to the communication peer endpoint to which the data packet is sent.

16. An access service node (ASN) in a network based on identity identifier and location identifier separation architecture, wherein, the ASN comprises at least one processor executing:

provided access services for an endpoint, maintaining connections between the endpoint and the network, allocating routing identities (RIDs) to the endpoint, registering and inquiring the RIDs of the endpoint in a mapping forwarding plane, maintaining an access identifier to routing identifier (AID-RID) mapping information of the endpoint, and implementing the routing and forwarding of a data message; cooperating with an authentication center to authenticate the endpoint and charging the services, as well as cooperating with other ASN to implement the switching of the endpoint across the ASN;

the at least one processor includes a first forwarding unit and a second forwarding unit, wherein, the first forwarding unit is set to, after receiving the data message sent by the endpoint accessing to the ASN, inquire the AID-RID mapping information in a local cache according to the AID, which works as the destination address in the data message, of the communication peer endpoint, if the RID of the communication peer endpoint is searched out, take the RID of the communication peer endpoint as the destination address, and take the RID of the endpoint as the source address, and encapsulate in the data message, then send the encapsulated data message to a generalized forwarding plane; if the RID of the communication peer endpoint is not searched out, tunneling encapsulate and forward the data message to the mapping forwarding plane, and notify the mapping management module to inquire the RID of the communication peer endpoint;

the second forwarding unit is set to, after receiving the data message which is to be sent to the endpoint accessing to the ASN, remove the encapsulated RID in the data message and recover to the format of the data message sent by the communication peer endpoint to the ASN, then send the data message to the endpoint via the connection between the ASN and the endpoint.

17. An interconnect service node (ISN) in a network based on identify identifier and location identifier separation architecture, wherein, the ISN comprises at least one processor executing:

inquiring and maintaining access identifier to routing identifier (AID-RID) mapping information of an endpoint of the network, encapsulating, routing and forwarding a data message transporting between the network and a Legacy IP network, achieving interconnection between the network and the Legacy IP network;

the at least one processor includes a first forwarding unit and a second forwarding unit, wherein, the first forwarding unit is set to, according to the AID of the endpoint in the data message sent by the Legacy IP network, inquire the AID-RID mapping information in the local cache: if the RID corresponding to the AID of the endpoint is searched out, take the RID of the endpoint as the destination address to encapsulate in the data message, then forward the encapsulated data message to the generalized forwarding plane; if the RID corresponding to the AID of the endpoint is not searched out, tunneling encapsulate and forward the data message to the mapping forwarding plane, and notify the mapping management module to inquire the RID of the endpoint;

the second forwarding unit is set to, after receiving a data message sent by the network, remove the encapsulated RID in the data message, and then send to the endpoint in the Legacy IP network or a format conversion module.

18. The ISN of claim 17, wherein, the at least one processor further includes a format conversion module, the format conversion module is set to convert IPV4/IPV6 addresses of the endpoint contained in the data message sent by the Legacy IP network into a corresponding AID, and then send to the first forwarding unit to forward; and convert the AID of the endpoint in the data message decapsulated by the second forwarding unit into a format of the IPV4/IPV6 addresses, and then send to the Legacy IP network endpoint.

19. A generalized forwarding plane in a network based on identify identifier and location identifier separation architecture, wherein, the generalized forwarding plane is set to route and forward a data message which takes a routing identifier (RID) as destination addresses according to the RID in the data message; the generalized forwarding plane has a common router, and an external interface of the common router is a third data forwarding interface, and the data message at the third data forwarding interface is newly encapsulated a third-layer header on the basis of the data message at a first data transmit-receive interface, a source address in the new third-layer header is the RID allocated to an endpoint which sends the data packet, and the destination address is the RID allocated to the communication peer endpoint to which the data packet is sent; and wherein, there are a signaling interface and the first data transmit-receive interface between the ASN and the endpoint, and the signaling interface between the ASN and the endpoint is set to process information flow of access management, switching, authentication, accounting and registration; in the data message at the first data transmit-receive interface, the source address is the AID of the endpoint which sends a data packet, and the destination address is the AID of the communication peer endpoint to which the data packet is sent.

20. A backbone network, comprising the generalized forwarding plane of claim 19.

* * * * *